(12) United States Patent
Chen et al.

(10) Patent No.: US 10,786,799 B2
(45) Date of Patent: Sep. 29, 2020

(54) METHOD FOR CONTINUOUSLY MANUFACTURING AN AEROGEL POWDER HAVING A HYDROPHOBIC-HYDROPHILIC BIPOLAR CORE-SHELL STRUCTURE

(71) Applicant: Taiwan Aerogel Technology Material Co., Ltd., Tainan (TW)

(72) Inventors: Jean-Hong Chen, Tainan (TW); Shiu-Shiu Chen, Tainan (TW)

(73) Assignee: TAIWAN AEROGEL TECHNOLOGY MATERIAL CO., LTD., Tainan (TW)

( * ) Notice: Subject to any disclaimer, the term of this patent is extended or adjusted under 35 U.S.C. 154(b) by 48 days.

(21) Appl. No.: 16/207,128

(22) Filed: Dec. 1, 2018

(65) Prior Publication Data

US 2020/0171455 A1  Jun. 4, 2020

(51) Int. Cl.
*C08L 83/04* (2006.01)
*B01J 13/18* (2006.01)

(52) U.S. Cl.
CPC ............ *B01J 13/185* (2013.01); *C08L 83/04* (2013.01); *C08L 2205/025* (2013.01); *C08L 2207/53* (2013.01)

(58) Field of Classification Search
CPC .............. B01J 13/185; C08L 2205/025; C08L 2207/53; C08L 83/04; C08J 9/40; C08J 9/228; C08J 9/28; C08G 77/16; C08G 77/18; C08G 77/24; C08G 77/26; C08G 77/14; C08G 77/04; B01G 13/0091
USPC .................................................. 523/200, 201
See application file for complete search history.

(56) References Cited

U.S. PATENT DOCUMENTS

| | | | | |
|---|---|---|---|---|
| 5,830,387 | A | * | 11/1998 | Yokogawa .......... C01B 33/1585 252/62 |
| 2018/0078918 | A1 | * | 3/2018 | Chen ..................... C01B 33/155 |
| 2019/0055374 | A1 | * | 2/2019 | Chen ..................... D04H 1/587 |
| 2019/0160446 | A1 | * | 5/2019 | Chen .................... B01J 13/0091 |

* cited by examiner

*Primary Examiner* — Hannah J Pak
(74) *Attorney, Agent, or Firm* — WPAT, PC

(57) ABSTRACT

A method for producing an aerogel granule having a hydrophobic-hydrophilic bipolar core-shell structure combines an aerogel precursor having a hydrophilic structure with another aerogel precursor having a hydrophobic structure. The method comprises the steps of: mixing a hydrophilic alkoxysilane compound, a hydrophobic alkyl-substituted alkoxysilane compound, and an organic solvent to form a mixture; adding an acidic catalyst to the mixture to perform hydrolysis; adding a basic catalyst to the hydrolyzed mixture to perform condensation, and during the condensation adding a dispersion solvent to the hydrolyzed mixture and stirring the hydrolyzed mixture to gelate so as to form the aerogel granule having a hydrophobic-hydrophilic bipolar core-shell structure.

10 Claims, 5 Drawing Sheets

METHOD FOR CONTINUOUSLY MANUFACTURING AN AEROGEL POWDER HAVING A HYDROPHOBIC-HYDROPHILIC BIPOLAR CORE-SHELL STRUCTURE

FIELD OF THE INVENTION

The present invention is directed to a method for continuously manufacturing an aerogel powder having a hydrophobic-hydrophilic bipolar core-shell structure, and more particularly to an improved sol-gel condensation-dispersion method for producing an aerogel powder having a hydrophobic-hydrophilic bipolar core-shell structure.

BACKGROUND OF THE INVENTION

An aerogel is a porous material with a three-dimensional net-like structure, and also a technological product having low density, high specific surface area, and low thermal conductivity. Therefore, an aerogel is mainly used for thermal insulation. An aerogel powder has high porosity (>90%) and low bulk density (0.04~0.2 g/cm$^3$). The high porosity property gives an aerogel high specific surface area (for example, a silica aerogel has specific surface area of >500 m$^2$/g). Since the function of an aerogel is related to the pore content unoccupied by a solvent, there is a need to maintain the pore content unoccupied by a solvent and air content therein in a high level, e.g. light weight, high heat isolation, high specific surface area, and high catalytic activity. Based on that a hydrophobic aerogel powder is incompatible with a hydrophilic solvent and suspended on a surface thereof, the hydrophobic aerogel powder can't be subject to a dispersion process in the hydrophilic solvent. That is, the hydrophobic aerogel powder can be merely dispersed in a hydrophobic solvent, e.g. toluene or acetone. Additionally, after the hydrophobic aerogel powder absorbs the hydrophobic solvent, the solvent penetrates into the inner of the hydrophobic aerogel powder. By such a manner, the hydrophobic solvent occupies the pores occupied by air, and thus the hydrophobic aerogel powder loses its heat isolation property. Meanwhile, based on that a hydrophilic aerogel powder is incompatible with a hydrophobic solvent and suspended on a surface thereof, the hydrophilic aerogel powder can't be subject to a dispersion process in the solvent. In other words, the hydrophilic aerogel powder can be merely dispersed in a hydrophilic solvent, e.g. water or ethanol. Moreover, after the hydrophilic aerogel powder absorbs the hydrophilic solvent, the solvent penetrates into the inner of the hydrophilic aerogel powder. In such a way, the hydrophilic solvent occupies the pores occupied by air, and then the hydrophilic aerogel powder loses the heat isolation property. Accordingly, there is a need to improve the inoperability of any commercial aerogel material in various solvents and to maintain/enhance the function thereof.

A conventional method for producing a hydrophilic aerogel is a sol-gel synthesis method. Firstly, a precursor (e.g. alkoxysilane or tetramethoxysilane) and an organic solvent are mixed well, and then an acidic catalyst is added thereto to perform hydrolysis. After the hydrolysis reaction, a basic catalyst is added thereto to perform condensation. During the condensation reaction, a sol is formed and then molecules of the sol are linked with bonds to form a macromolecule semisolid gel. After aging for a period, a stable three-dimension net-like structure is formed. Finally, the solvent in the net-like structure, e.g. water or methanol, is removed through supercritical drying to form a bulky hydrophilic aerogel. Supercritical drying avoids the aerogel breakage caused by surface tension of water in a normal pressure drying. However, since supercritical drying is implemented under high pressure, few of the hydrophilic aerogel is dried every supercritical drying. Accordingly, supercritical drying isn't suitable for mass production and cost down.

A conventional method for producing a hydrophobic aerogel is a sol-gel synthesis method. Firstly, a precursor (e.g. alkoxysilane or tetramethoxysilane) and an organic solvent are mixed with each other, and then an acidic catalyst is added thereto to perform hydrolysis. After the hydrolysis, a basic catalyst is added thereto to perform condensation. During the condensation, a sol is formed and then molecules of the sol are linked with bonds to form a macromolecule semisolid gel. After aging for a period, the gel is triturated to form a smashed wet aerogel. The wet aerogel is hydrophobically modified with trimethylsilyl chloride (TMCS) so that the hydrophilic groups (—OH) in the pores of the wet aerogel are converted into hydrophobic groups (—CH$_3$). Finally, the wet aerogel is dried under a room temperature and a normal pressure to form a hydrophobic aerogel powder. Since the hydrophobic aerogel powder is obtained under a room temperature and a normal pressure, it is suitable for mass production and cost down. Additionally, the hydrophobic aerogel powder is only used in specific kinds of organic solvents or organic plastic materials.

Further, the hydrophobic aerogel powder can be thermally cracked under a temperature of greater than 250° C. so as to lead to dust explosion.

However, a hydrophilic aerogel powder or a hydrophobic aerogel powder is easy to be unevenly distributed and aggregated when post-processing is performed thereon in an incompatible solvent system. In the other aspect, air in the pores of a hydrophilic aerogel powder or a hydrophobic aerogel powder is replaced with a compatible solvent to lose the heat isolation property when post-processing is performed on the aerogel powder in the compatible solvent system. For these reasons, a single hydrophilic aerogel powder or a single hydrophobic aerogel powder can't exhibit even and great heat isolation after post-processing.

SUMMARY OF THE INVENTION

In order to improve the drawbacks that a single hydrophilic aerogel powder or a single hydrophobic aerogel powder is unevenly distributed or loses its heat isolation property after post-processing, the inventors provide a method for producing an aerogel granule having a hydrophobic-hydrophilic bipolar core-shell structure through combining an aerogel precursor having a hydrophilic structure and another aerogel precursor having a hydrophobic structure. The provided method comprises the steps of: mixing a hydrophilic alkoxysilane compound, a hydrophobic alkyl-substituted alkoxysilane compound (e.g. methyltrimethoxysilane (MTMS)), and an organic solvent to form a mixture; adding an acidic catalyst to the mixture to perform hydrolysis; adding a basic catalyst to the hydrolyzed mixture to perform condensation, and during the condensation adding a dispersion solvent to the hydrolyzed mixture and stirring the hydrolyzed mixture to gelate so as to form the aerogel granule having a hydrophobic-hydrophilic bipolar core-shell structure. In the condensation reaction, the content ratio of the hydrophilic alkoxysilane compound or the hydrophobic alkyl-substituted alkoxysilane compound in the mixture is controlled and a hydrophobic-hydrophilic property of the dispersion solvent is adjusted to make a hydrophilic component of the dispersion solvent attract the hydrophilic alkoxysilane compound and to make the hydrophilic component of the dispersion solvent repel the hydrophobic alkyl-substituted alkoxysilane compound. In such a manner, the hydrophilic alkoxysilane compound in the mixture spreads outwardly under the environment of a hydrophilic dispersion solvent to perform the condensation so as to form a hydrophilic shell; in contrast, the hydrophobic alkyl-substituted alkoxysilane compound gathers inwardly under the environment of a hydrophilic dispersion solvent to perform the condensation so as to form a hydrophobic core. That is, after the mixture is stirred under the environment of a hydrophilic dispersion solvent, an aerogel granule having a hydrophilic shell and a hydrophobic core is formed. On the other aspect, after the mixture is stirred under the environment of a hydrophobic dispersion solvent, an aerogel granule having a hydrophobic shell and a hydrophilic core is formed. The producing method is very simple. The producing method takes 3-4 hours and is suitable for continuously manufacturing an aerogel powder having a hydrophobic-hydrophilic bipolar core-shell structure so as to increase the productivity.

Preferably, the hydrophilic alkoxysilane compound is selected from the group consisting of tetramethoxysilane (TMOS), tetraethoxysilane (TEOS), R group-trimethoxysilane (R-TMS), and R group-triethoxysilane (R-TES); each R group is a hydrophilic group comprising a carboxyl group (—COOH), an amino group (—$NH_2$), an imino group (=NH), a hydroxyl group (—OH), an amido group (—CONH—), an epoxy group (—COH—COH), or an uricyl group (—NHCONH—) and has 1-8 carbon atom(s).

Preferably, the hydrophobic alkyl-substituted alkoxysilane compound is selected from the group consisting of R' group-trimethoxysilane (R'-TMS), R' group-tetraethoxysilane (R'-TES), and R' group-silicone; each R' group is a hydrophobic group comprising an alky group (—$CH_3$), an alkenyl group (—$CH_2$=$CH_2$), an ester group (—CO—OR), an ether group (—C—O—C—), an aromatic group (—$C_6H_4$—), or a halogen (—X) and has 1-13 carbon atom(s).

Preferably, the organic solvent is selected from the group consisting of water, alcohol, amine, acid, ketone, ether, ester, aromatic hydrocarbon, and alkane.

Preferably, the dispersion solvent comprises a hydrophilic dispersion solvent or a hydrophobic dispersion solvent on demand; the hydrophilic dispersion solvent is selected from the group consisting of water, alcohol, amine, acid, ketone, and ether; the hydrophobic dispersion solvent is selected from the group consisting of ketone, ether, ester, aromatic hydrocarbon, and alkane.

Preferably, during the condensation reaction, a hydrophilic dispersion solvent (e.g. water, alcohol, amine, acid, ketone, or ether) is added to the hydrolyzed mixture so that a hydrophilic group (e.g. —OH, —COOH, or —$NH_2$) is formed on an outer surface of the aerogel granule under the hydrogen bond force of the hydrophilic dispersion solvent to obtain an aerogel granule having a hydrophilic outer shell and a hydrophobic inner core; during the condensation reaction, a hydrophobic dispersion solvent (e.g. ketone, ether, ester, aromatic hydrocarbon, or alkane) is added to the hydrolyzed mixture so that a hydrophobic group (e.g. —$CH_3$, —X, or —$C_2H_5$) is formed on an outer surface of the aerogel granule to obtain an aerogel granule having a hydrophobic outer shell and a hydrophilic inner core.

Preferably, after the condensation the dispersion solvent in the aerogel granule is filtered out using a filter and then the aerogel granule is dried to form an aerogel powder having a hydrophobic-hydrophilic bipolar core-shell structure.

The inventors provide an aerogel granule having a hydrophobic-hydrophilic bipolar core-shell structure, which is made through a method comprising the steps of: mixing a hydrophilic alkoxysilane compound, a hydrophobic alkyl-substituted alkoxysilane compound, and an organic solvent to form a mixture; adding an acidic catalyst to the mixture to perform hydrolysis; adding a basic catalyst to the hydrolyzed mixture to perform condensation, and during the condensation adding a dispersion solvent to the hydrolyzed mixture and stirring the hydrolyzed mixture to gelate so as to form the aerogel granule having a hydrophobic-hydrophilic bipolar core-shell structure. In addition, the aerogel granule may be dried to form an aerogel powder having a hydrophobic-hydrophilic bipolar core-shell structure. The particle size of the foregoing aerogel granule may be in the range from several hundred nm to several hundred μm, and its particle size, porosity, and pore size can be adjusted by the process condition, such as the content ratio of the hydrophilic alkoxysilane compound and the hydrophobic alkyl-substituted alkoxysilane compound, the content of the organic solvent, the viscosity of the organic solvent, the content of the acidic catalyst or the basic catalyst, the content of the dispersion solvent, or the stirring rate.

The present invention provides the following advantages:

1. During the condensation the incompatible dispersion solvent is stirred so as to form a homogenous globular aerogel granule having a hydrophobic outer shell and a hydrophilic inner core or a homogenous globular aerogel granule having a hydrophilic outer shell and a hydrophobic inner core. Additionally, the aerogel granule exhibits so great dispersibility that it has a great heat isolation property. Accordingly, the product utility is enhanced.

2. On condition of an aerogel granule having a hydrophilic outer shell and a hydrophobic inner core, it is easily combined with a hydrophilic solvent (e.g. water or alcohol) or a hydrophilic substrate because of the hydrophilic outer shell, and it still contains large amount of air and has high porosity in the hydrophilic solvent because of the hydrophobic inner core. That is, the aerogel granule having a hydrophilic outer shell and a hydrophobic inner core can be evenly distributed in the hydrophilic solvent without precipitation. Therefore, the aerogel granule having a hydrophilic outer shell and a hydrophobic inner core can be directly added to the hydrophilic solvent or the hydrophilic substrate in post-processing to maintain its high heat isolation property.

3. On condition of an aerogel granule having a hydrophobic outer shell and a hydrophilic inner core, it is easily combined with a hydrophobic solvent (e.g. toluene or acetone) or a hydrophobic substrate because of the hydrophobic outer shell, and it still contains large amount of air and has high porosity in the hydrophobic solvent because of the hydrophilic inner core. That is, the aerogel granule having a hydrophobic outer shell and a hydrophilic inner core can be evenly distributed in the hydrophobic solvent without precipitation. Therefore, the aerogel granule having a hydrophobic outer shell and a hydrophilic inner core can be directly added to the hydrophobic solvent or the hydrophobic substrate in post-processing to maintain its high heat isolation property.

4. The hydrophobic-hydrophilic property of the aerogel granule can be controlled by adjusting the categories of the hydrophilic alkoxysilane compound, the categories of the hydrophobic alkyl-substituted alkoxysilane compound, or the content thereof.

5. The particle size of the aerogel granule can be effectively controlled by adjusting the organic solvent content, the dispersion solvent content, and the stirring rate. For example, the higher the content of the organic solvent or the incompatible dispersion solvent is, or the higher the stirring rate is, the smaller the aerogel granule is; otherwise, the lower the content of the organic solvent or the incompatible dispersion solvent is, or the lower the stirring rate is, the bigger the aerogel granule is.

6. In the condensation, a hydrophilic dispersion solvent or a hydrophobic dispersion solvent can be alternatively added to the mixture to form an aerogel granule having a hydrophobic outer shell and a hydrophilic inner core or an aerogel granule having a hydrophilic outer shell and a hydrophobic inner core. In such a manner, the hydrophobic-hydrophilic property of the aerogel granule can be rapidly controlled, and the production rate can be controlled. Accordingly, the production efficiency and the dispersion efficiency are both enhanced.

DETAILED DESCRIPTION OF THE INVENTION

The detailed description and preferred embodiments of the invention will be set forth in the following content, and provided for people skilled in the art so as to understand the characteristics of the invention.

The present invention provides a technique related to continuously manufacturing an aerogel granule having a hydrophilic outer shell and a hydrophobic inner core or an aerogel granule having a hydrophobic outer shell and a hydrophilic inner core, and the technical effect is clearly presented in the following content.

Figure 1:
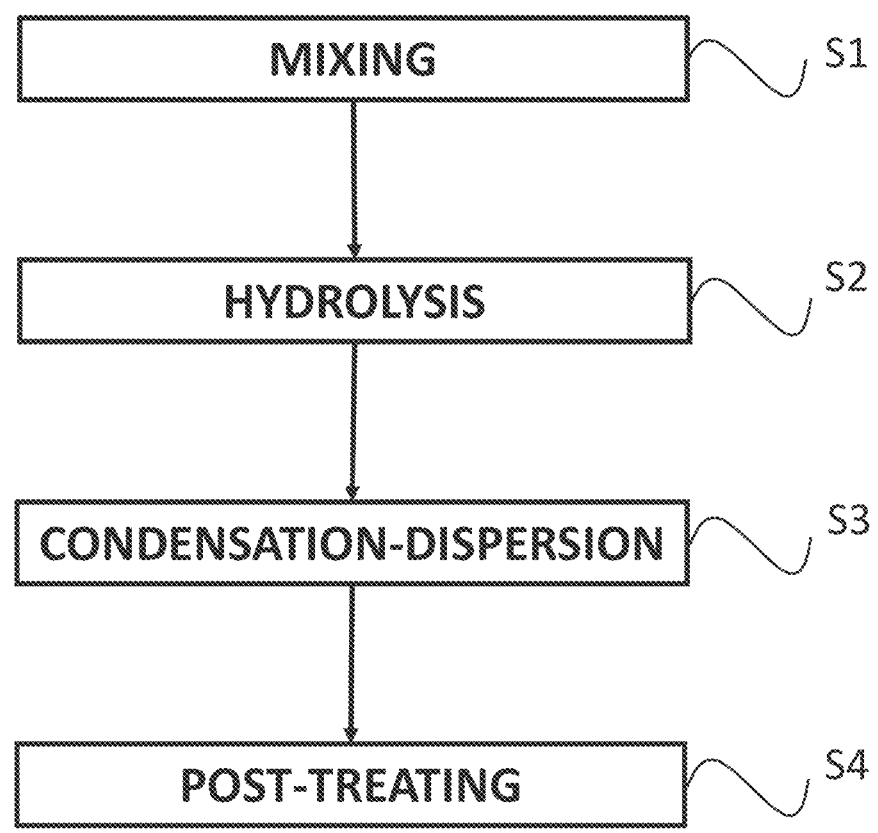
FIG. 1 is a flow chart illustrating an embodiment of the present invention.

As shown in FIG. 1, an embodiment of the present invention discloses a method for producing an aerogel granule, and the method includes the steps of: a mixing step (S1), a hydrolysis step (S2), a condensation-dispersion step (S3), and a post-treating step (S4).

In the mixing step (S1), a hydrophilic alkoxysilane compound and a hydrophobic alkyl-substituted alkoxysilane compound are added to an organic solvent to form a mixture. In an example, the hydrophilic alkoxysilane compound is tetramethoxysilane (TMOS), tetraethoxysilane (TEOS), R group-trimethoxysilane (R-TMS), or R group-triethoxysilane (R-TES), and each R group is a hydrophilic group comprising a carboxyl group (—COOH), an amino group (—NH$_2$), an imino group (=NH), a hydroxyl group (—OH), an amido group (—CONH—), an epoxy group (—COH—COH), or an uricyl group (—NHCONH—) and has 1-8 carbon atom(s); the hydrophobic alkyl-substituted alkoxysilane compound is R' group-trimethoxysilane (R'-TMS), R' group-tetraethoxysilane (R'-TES), or R' group-silicone, each R' group is a hydrophobic group comprising an alky group (—CH$_3$), an alkenyl group (—CH$_2$=CH$_2$), an ester group (—CO—OR), an ether group (—C—O—C—), an aromatic group (—C$_6$H$_4$—), a halogen (—X), or a halogen aromatic group (—C$_6$H$_5$X) and has 1-13 carbon atom(s). An exemplary example of the R' group-silicone is polydimethylsiloxane (PDMS). Based on the total moles of the mixture, the total content of the hydrophilic alkoxysilane compound and the hydrophobic alkyl-substituted alkoxysilane compound is of 1 mol %-60 mol % and the content of the organic solvent is of 40 mol %-99 mol %.

In the hydrolysis step (S2), an acidic catalyst is added to the mixture to perform hydrolysis. The entity of the hydrophilic alkoxysilane compound and the hydrophobic alkyl-substituted alkoxysilane compound and the acidic catalyst are at a mole ratio of 1:0.5-1:0.00001. While the entity of the hydrophilic alkoxysilane compound and the hydrophobic alkyl-substituted alkoxysilane compound and the acidic catalyst are at a mole ratio of 1:0.00001, the hydrolysis reaction takes 900 minutes; while the entity of the hydrophilic alkoxysilane compound and the hydrophobic alkyl-substituted alkoxysilane compound and the acidic catalyst are at a mole ratio of 1:0.5, the hydrolysis reaction takes 60 minutes. In conclusion, the more content the acidic catalyst has, the less time the hydrolysis reaction takes.

In the condensation-dispersion step (S3), a basic catalyst is added to the mixture to perform condensation. In an example, the basic catalyst and the acidic catalyst are at a mole ratio of 1:1-5:1. Further, the increasing of the content of the basic catalyst can shorten the condensation time. While the basic catalyst and the acidic catalyst are at a mole ratio of 1:1, the condensation reaction takes 900 minutes; while the basic catalyst and the acidic catalyst are at a mole ratio of 5:1, the condensation reaction takes 1 minute. That is, the content ratio of the basic catalyst and the acidic catalyst can be adjusted to control the time for the process. In another aspect, while the condensation reaction nears completion, the mixture becomes a viscous sol.

During the condensation reaction, when the mixture becomes a pre-gel, a large number of the hydrophilic dispersion solvent or the hydrophobic dispersion solvent is added thereto and stirred. By such a manner, the pre-gel becomes spherical or pearly under the dispersion force resulted from stirring. Under the environment of a large number of the hydrophilic dispersion solvent, the solvent attracts the hydrophilic alkoxysilane compound and repels the hydrophobic alkyl-substituted alkoxysilane compound so that the hydrophilic alkoxysilane compound spread outwardly to form an outer shell and the hydrophobic alkyl-substituted alkoxysilane compound gathers inwardly to form an inner core. As such, under the stirring of the hydrophilic dispersion solvent, the mixture is condensed to form an aerogel granule having a hydrophilic outer shell and a hydrophobic inner core. Conversely, under the stirring of the hydrophobic dispersion solvent, the mixture is condensed to form an aerogel granule having a hydrophobic outer shell and a hydrophilic inner core. The aerogel granule has a particle size of at most several hundred μm or at least 100 nm, and the particle size and the stirring rate are in inverse proportion so that the particle size can be adjusted by controlling the stirring rate.

An example of the hydrophilic dispersion solvent is water, conditioning water, deionized water, C1-C16 alcohol, C2-C16 ether, C3-C16 ketone, C2-C16 ester, C1-C16 acid, or C1-C16 amine. Specifically, the hydrophilic dispersion solvent is water, conditioning water, deionized water, methanol, ethanol, acetone, butyl ether, ethyl acetate, butyl acetate, formic acid, or ammonium hydroxide.

An example of the hydrophobic dispersion solvent is C2-C16 ether, C3-C16 ketone, C2-C16 ester, C6-C16 aromatic hydrocarbon, C5-C16 alkane, C2-C16 halogen ether, C2-C16 halogen aromatic hydrocarbon, C2-C16 halogen alkane, or C2-C16 halogen ester. Specifically, the hydrophobic dispersion solvent is acetone, butyl ether, ethyl acetate, butyl acetate, cyclohexane, n-hexane, toluene, kerosene, or cleaning naphtha.

It is noted that when using the hydrophilic dispersion solvent in the condensation-dispersion step (S3), a hydrophilic group (e.g. —OH, —COOH, or —NH$_2$) in the mixture is present on an outer surface of the aerogel granule and a hydrophobic group in the mixture is present in an inner core of the aerogel granule to obtain an aerogel granule having a hydrophilic outer shell and a hydrophobic inner core.

It is also noted that when using the hydrophobic dispersion solvent in the condensation-dispersion step (S3), a hydrophobic group (e.g. —CH$_3$, —X, or —C$_2$H$_5$) in the mixture is present on an outer surface of the aerogel granule and a hydrophilic group in the mixture is present in an inner core of the aerogel granule to obtain an aerogel granule having a hydrophobic outer shell and a hydrophilic inner core.

In the post-treating step (S4), the dispersion solvent in the aerogel granule is removed through filtering the aerogel granule with a filter. After which, an aerogel powder having a hydrophilic outer shell and a hydrophobic inner core or an aerogel powder having a hydrophobic outer shell and a hydrophilic inner core is obtained.

In order to rapidly obtaining the aerogel powder, the aerogel granule is alternatively heated in a fluidized bed or an oven under a temperature of 80-250° C.

According to the method described above, a surface-hydrophilic homogenous spherical aerogel granule or a surface-hydrophobic homogenous spherical aerogel granule is manufactured. In another aspect, the homogeneity in appearance and size of the aerogel granule is enhanced to increase its application. In the other aspect, the method can directly provide a surface-hydrophilic aerogel granule or a surface-hydrophobic aerogel granule so it is suitable for mass production.

Figure 2A:
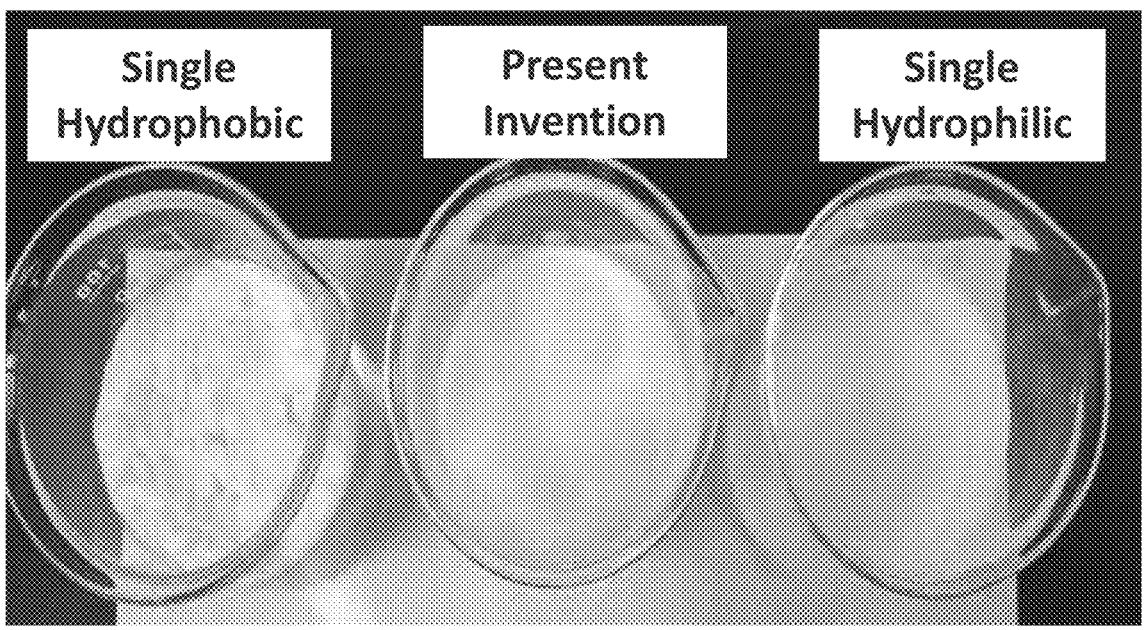
FIG. 2A is a top view showing the dispersion of (i) an aerogel granule having a hydrophilic outer shell and a hydrophobic inner core of the present invention, (ii) a single hydrophilic aerogel granule, and (iii) a single hydrophobic aerogel granule in water.
Figure 2B:
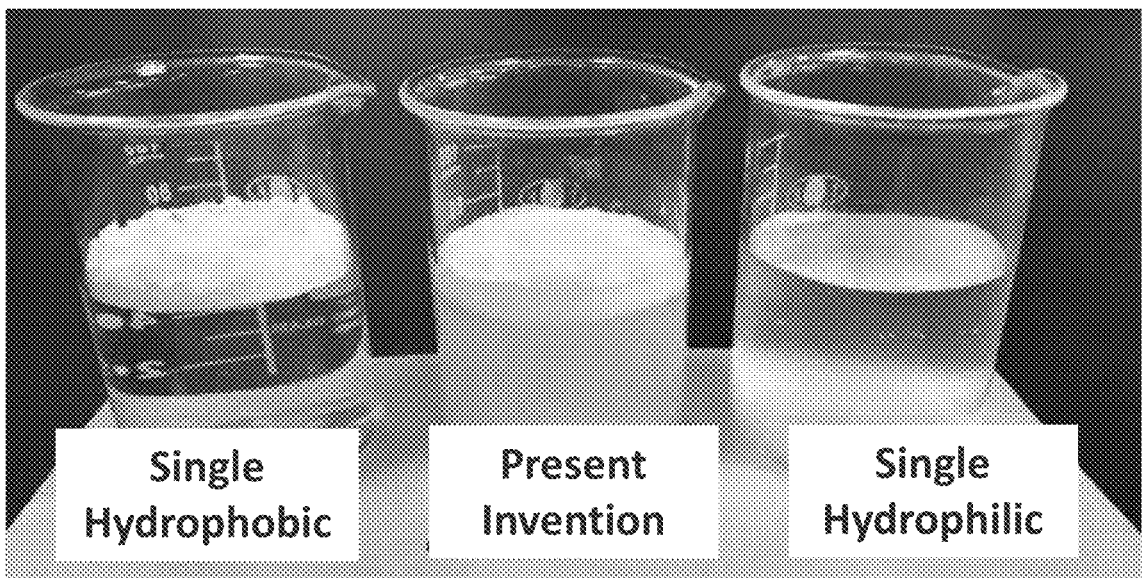
FIG. 2B is a side view showing the dispersion in water of FIG. 2A.

As shown in FIGS. 2A and 2B, an aerogel granule having a hydrophilic outer shell and a hydrophobic inner core, a single hydrophilic aerogel granule, and a single hydrophobic aerogel granule are added to water. Since the single hydrophobic aerogel granule has low density and is incompatible with water, the single hydrophobic aerogel granule floats on water. Therefore, the single hydrophobic aerogel granule is difficulty distributed in post-processing. The single hydrophilic aerogel granule can absorb water. After the water absorption, the pores of the single hydrophilic aerogel granule are filled with water and thus the single hydrophilic aerogel granule precipitates in water. As such, air in the pores of the single hydrophilic aerogel granule disappears so that the single hydrophilic aerogel granule loses the heat isolation property after dispersion. The aerogel granule of the present invention has a hydrophilic outer shell and a hydrophobic inner core. By the hydrophilic outer shell, the aerogel granule of the present invention is compatible with water and evenly distributed in water; by the hydrophobic inner core, water can't penetrate into the aerogel granule of the present invention. The inventive product is evenly distributed and evenly floats on water and its inner still contains air after the dispersion. That is, the inventive product still exhibits the heat isolation property after dispersion in a hydrophilic solvent.

Figure 3A:
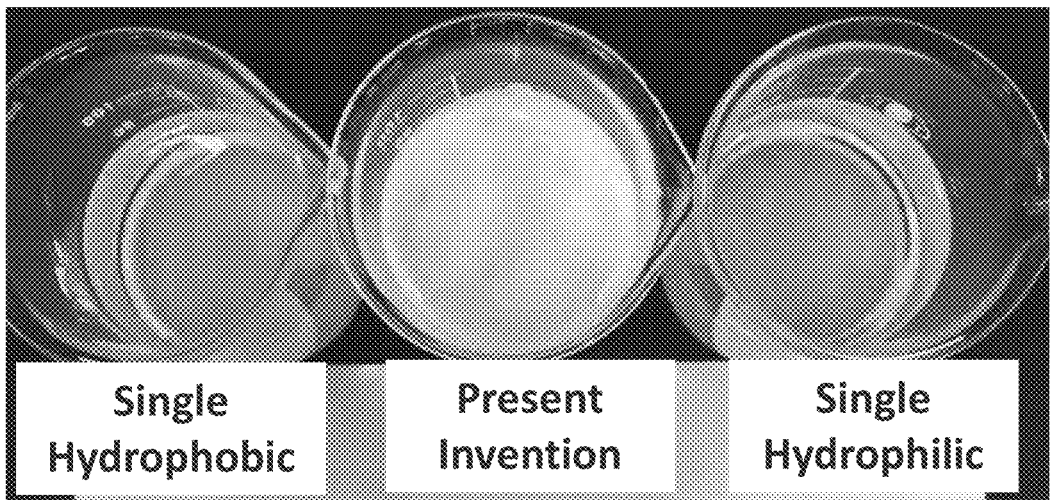
FIG. 3A is a top view showing the dispersion of (i) an aerogel granule having a hydrophobic outer shell and a hydrophilic inner core of the present invention, (ii) a single hydrophilic aerogel granule, and (iii) a single hydrophobic aerogel granule in toluene.
Figure 3B:
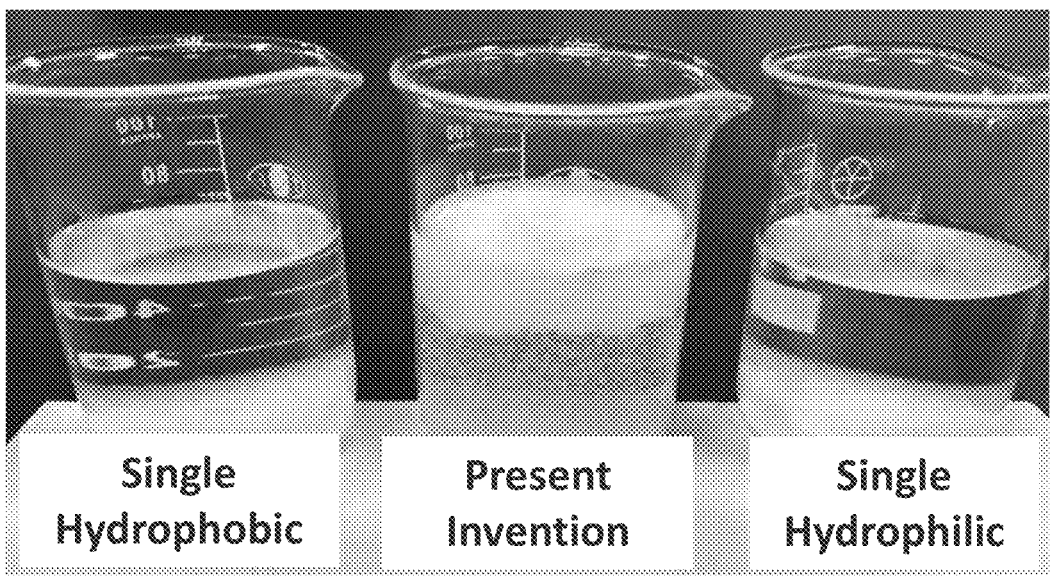
FIG. 3B is a side view showing the dispersion in water of FIG. 3A.

As shown in FIGS. 3A and 3B, an aerogel granule having a hydrophobic outer shell and a hydrophilic inner core, a single hydrophilic aerogel granule, and a single hydrophobic aerogel granule are added to toluene. Since the single hydrophilic aerogel granule and the single hydrophobic aerogel granule both absorb toluene and air in pores of each aerogel granule disappears, each aerogel granule precipitates in toluene. Specifically, the precipitation of the single hydrophobic aerogel is even without aggregation, and the precipitation of the single hydrophilic aerogel is uneven with aggregation. The aerogel granule of the present invention has a hydrophobic outer shell and a hydrophilic inner core. By the hydrophobic outer shell, the aerogel granule of the present invention is compatible with toluene and evenly distributed in toluene; by the hydrophilic inner core, toluene can't penetrate into the aerogel granule of the present invention. The inventive product is evenly distributed and evenly floats on toluene and its inner still contains air after the dispersion. That is, the inventive product still exhibits the heat isolation property after dispersion in a hydrophobic solvent.

Figure 4:
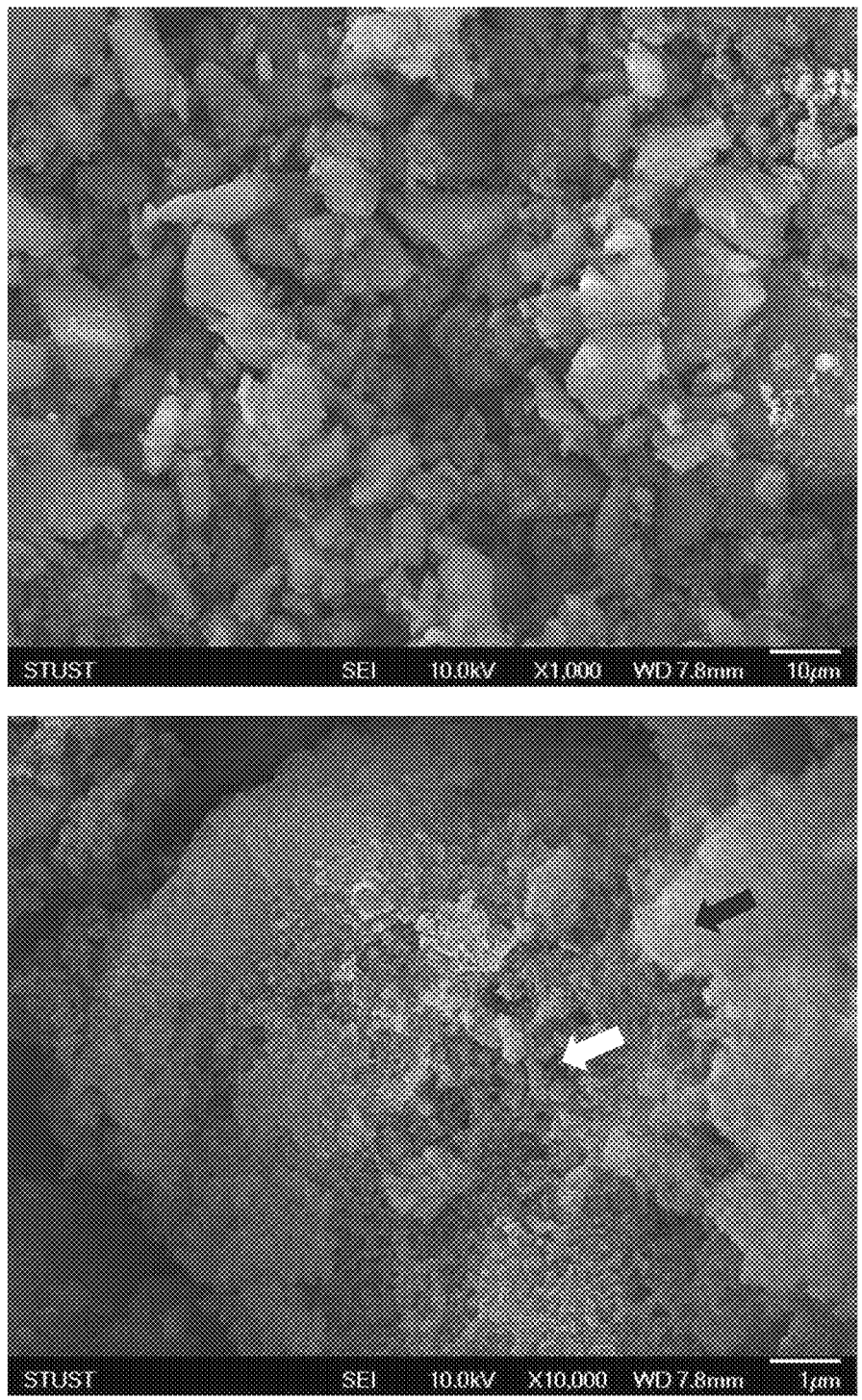
FIG. 4 is a microscopic picture showing an aerogel granule having a hydrophilic outer shell and a hydrophobic inner core and made at a stirring rate of 500 rpm has a granule size of 10 μm.

As shown in FIG. 4, a surface-hydrophilic aerogel granule is shown under a scanning electron microscope (SEM) at various magnifications. The aerogel granule is a semispherical aerogel granule; it has a compact hydrophilic structure (as indicated by the black arrow) on its outer surface, and a loose hydrophobic structure (as indicated by the white arrow) in its inner.

Figure 5:
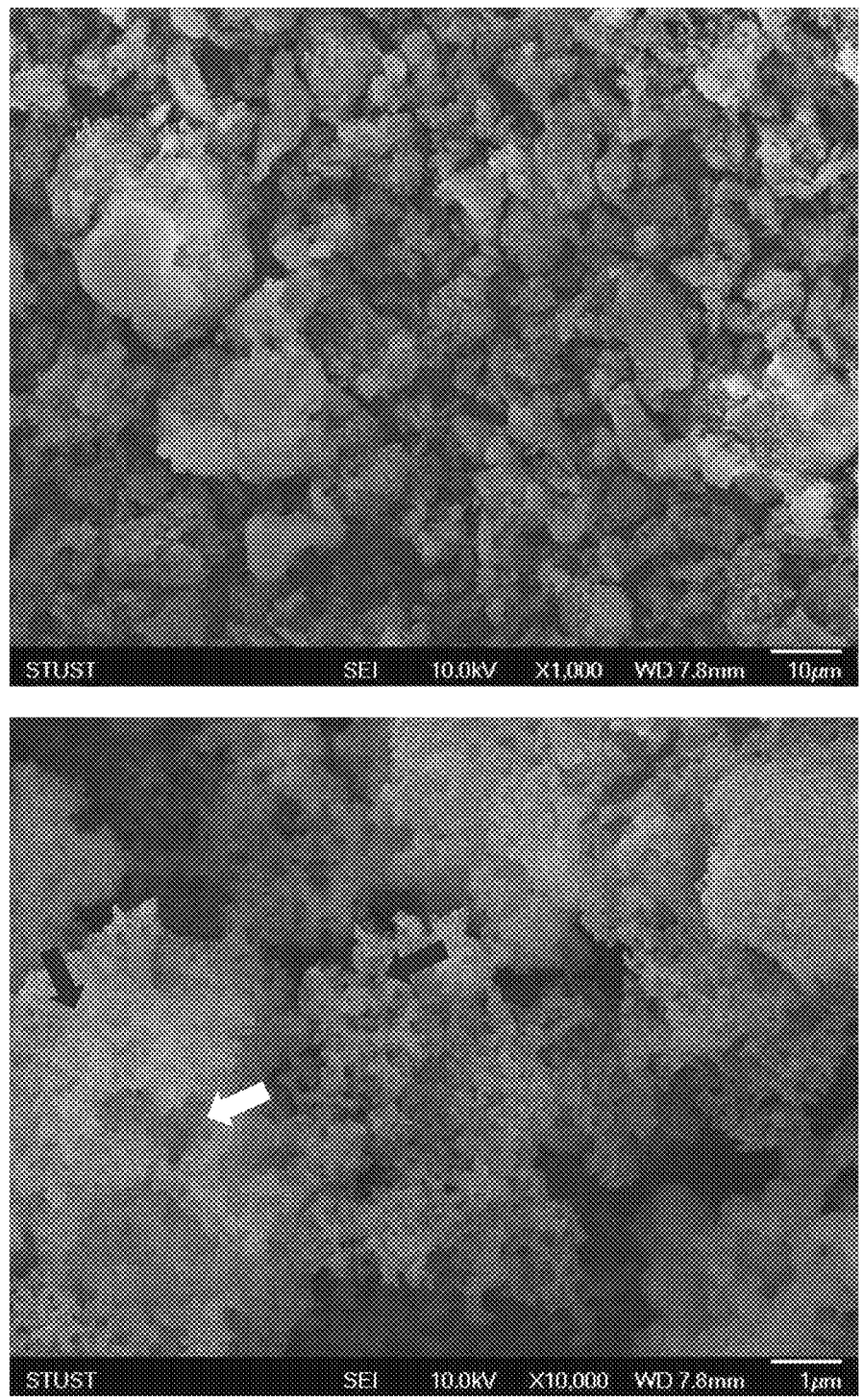
FIG. 5 is a microscopic picture showing an aerogel granule having a hydrophobic outer shell and a hydrophilic inner core and made at a stirring rate of 500 rpm has a granule size of 10 μm.

As shown in FIG. 5, a surface-hydrophobic aerogel granule is shown under a scanning electron microscope at various magnifications. The aerogel granule is a spherical aerogel granule; it has a loose hydrophobic structure (as indicated by the black arrow) on its outer surface, and a compact hydrophilic structure (as indicated by the white arrow) in its inner.

While the invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for manufacturing an aerogel powder, comprising:
   mixing a hydrophilic alkoxysilane compound, a hydrophobic alkyl-substituted alkoxysilane compound, and an organic solvent to form a mixture;
   adding an acidic catalyst to the mixture to perform hydrolysis;

adding a basic catalyst to the hydrolyzed mixture to perform condensation, and during the condensation adding a dispersion solvent to the hydrolyzed mixture and stirring the hydrolyzed mixture for gelation so as to form an aerogel granule; and heating the aerogel granule in a fluidized bed or an oven under a temperature of 80-250° C. to form an aerogel powder;

wherein provided that the dispersion solvent is a hydrophobic dispersion solvent, the aerogel granule is an aerogel granule having a hydrophobic outer shell and a hydrophilic inner core and the aerogel powder is an aerogel powder having a hydrophobic outer shell and a hydrophilic inner core; before completion of the condensation, the hydrolyzed mixture becomes a viscous sol, the hydrophobic dispersion solvent is added to the hydrolyzed mixture, and then the hydrolyzed mixture is stirred so that the hydrolyzed mixture gelates under dispersion force caused by the hydrophobic dispersion solvent to form the aerogel granule having a hydrophobic outer shell and a hydrophilic inner core; or wherein provided that the dispersion solvent is a hydrophilic dispersion solvent, the aerogel granule is an aerogel granule having a hydrophilic outer shell and a hydrophobic inner core and the aerogel powder is an aerogel powder having a hydrophilic outer shell and a hydrophobic inner core; before completion of the condensation, the hydrolyzed mixture becomes a viscous sol, the hydrophilic dispersion solvent is added to the hydrolyzed mixture, and then the hydrolyzed mixture is stirred so that the hydrolyzed mixture gelates under dispersion force caused by the hydrophilic dispersion solvent to form the aerogel granule is an aerogel granule having a hydrophilic outer shell and a hydrophobic inner core.

2. The manufacturing method as claimed in claim 1, wherein the hydrophilic alkoxysilane compound is tetramethoxysilane, tetraethoxysilane, R group-trimethoxysilane, or R group-triethoxysilane; each R group is a hydrophilic group comprising a carboxyl group, an amino group, an imino group, a hydroxyl group, an amido group, an epoxy group, or an uricyl group and has 1-8 carbon atom(s).

3. The manufacturing method as claimed in claim 1, wherein the hydrophobic alkyl-substituted alkoxysilane compound is methyltrimethoxysilane, R' group-trimethoxysilane, R' group-tetraethoxysilane, or R' group-silicone; each R' group is a hydrophobic group comprising an alky group, an alkenyl group, an ester group, an ether group, an aromatic group, or a halogen and has 1-13 carbon atom(s).

4. The manufacturing method as claimed in claim 1, wherein the hydrophilic dispersion solvent is water, alcohol, amine, acid, ketone, or ether.

5. The manufacturing method as claimed in claim 1, wherein the hydrophobic dispersion solvent is ketone, ether, ester, aromatic hydrocarbon, or alkane.

6. The manufacturing method as claimed in claim 1, wherein based on total moles of the mixture, total content of the hydrophilic alkoxysilane compound and the hydrophobic alkyl-substituted alkoxysilane compound is of 1 mol %-60 mol %, and content of the organic solvent is of 40 mol %-99 mol %.

7. The manufacturing method as claimed in claim 1, wherein an entity of the hydrophilic alkoxysilane compound and the hydrophobic alkyl-substituted alkoxysilane compound and the acidic catalyst are at a mole ratio of 1:0.5-1:0.00001.

8. The manufacturing method as claimed in claim 1, wherein the basic catalyst and the acidic catalyst are at a mole ratio of 1:1-5:1.

9. The manufacturing method as claimed in claim 1, wherein the hydrophilic alkoxysilane compound is tetramethoxysilane or tetraethoxysilane, and the hydrophobic alkyl-substituted alkoxysilane compound is methyltrimethoxysilane.

10. The manufacturing method as claimed in claim 1, wherein an entity of the hydrophilic alkoxysilane compound and the hydrophobic alkyl-substituted alkoxysilane compound and the acidic catalyst are at a mole ratio of 1:0.5-1:0.00001, and the basic catalyst and the acidic catalyst are at a mole ratio of 1:1-5:1.

* * * * *